United States Patent [19]

Gerritsen

[11] 3,906,303

[45] Sept. 16, 1975

[54] COLOUR TELEVISION DISPLAY APPARATUS INCORPORATING A TELEVISION DISPLAY TUBE

[75] Inventor: Jan Gerritsen, Eindhoven, Netherlands

[73] Assignee: U.S. Philips Corporation, New York, N.Y.

[22] Filed: Nov. 27, 1973

[21] Appl. No.: 419,433

[30] Foreign Application Priority Data

Dec. 15, 1972 Netherlands ....................... 7217050

[52] U.S. Cl. ................. 315/370; 315/399; 315/407

[51] Int. Cl.² .......................................... H01J 29/56

[58] Field of Search .. 315/24, 27 XY, 27 GD, 13 C, 315/370, 399, 407, 408

[56] References Cited

UNITED STATES PATENTS 3,440,483 4/1969 Kaashoek et al. .................... 315/24

3,602,764 8/1971 Poel .................................. 315/13 C 3,745,405 7/1973 Fuse .............................. 315/27 XY

*Primary Examiner*—Maynard R. Wilbur
*Assistant Examiner*—T. M. Blum
*Attorney, Agent, or Firm*—Frank R. Trifari; Henry I. Steckler

[57] ABSTRACT

Colour television display apparatus provided with a display tube in which the electron beams are generated in one plane. The deflection coils are designed in such known manner that the landing points of the beams on the display screen coincide. Owing to tolerance angular errors of the orientation of the plane relative to one direction of deflection convergence errors are produced in the other direction of deflection. They are corrected by means of a magnetic quadripolar field the polar axes of which substantially coincide with the directions of deflection and the field strength of which is a substantially quadratic function of either deflection current or the sum of both functions.

8 Claims, 7 Drawing Figures

COLOUR TELEVISION DISPLAY APPARATUS INCORPORATING A TELEVISION DISPLAY TUBE

Figure 1:
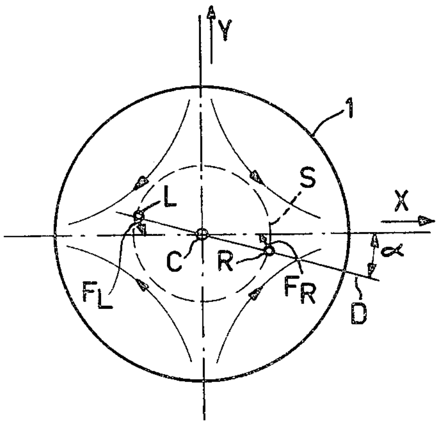

The invention relates to a colour television display apparatus incorporating a television display tube having a display screen and two deflection coils for the deflection in two directions of electron beams which are generated in the tube substantially in one plane, a first direction of deflection being substantially parallel to the said plane whilst the second direction of deflection is substantially at right angles to the first direction, the field generated by the deflection coil for deflection in the first direction having a distribution in which its meridional image plane substantially coincides with the screen whilst the field generated by the deflection coil for deflection in the second direction has a distribution in which its sagittal image plane substantially coincides with the screen, the deflection errors due to comma and anisotropic astigmatism being substantially zero, whilst at least one deflection coil is split into two substantially equal coil halves.

Such an apparatus is described by J. Haantjes and G. J. Lubben in "Philips Research Reports", Volume 14, February 1959, pages 65–97 and in U.S. Pat. No. 2,886,125. In this apparatus the landing points of the electron beams on the display screen coincide everywhere, in other words the various beams, which generally are three in number, which intersect the deflection plane along a straight line are imaged as points on the screen. It is assumed that both the construction of the device or devices which generate the beams, for example three cathodes, and the distribution of the deflection fields exactly satisfy the requirements derived in the said paper. In practice, however errors are produced which are due to tolerances so that the images of the beams on the screen are not points but lines which are substantially parallel to the second direction, i.e. convergence errors, for when a point is referred to what is actually meant is that each electron beam strikes a phosphor dot or stripe on the screen to cause it to luminesce in a given colour, the landing points being associated so as to be perceived as a single point. This is no longer the case if the aforementioned straight line, which is the projection of the plane of the three cathodes in the deflection plane, does not exactly coincide with the first direction of deflection but is at an angle thereto. This error is a tolerance error, i.e. it is small, and may be due to a slight misplacement of the cathodes and/or to a slightly incorrect field distribution within the display tube and hence to tolerances in the construction of the deflection coils.

If the first direction of deflection is horizontal and the second one is vertical, the said error entails a convergence error in the vertical direction. The aforementioned straight line in the deflection plane can be made to coincide with the horizontal direction of deflection by rotation. Attempts have been made to cancel the convergence errors due to this rotation by means of a coil which is axially arranged on the neck of the display tube and through which an adjustable direct current flows. The effect of this coil is comparable to that of a focussing coil; it exerts a force on the travelling electrons which causes their paths to be helical, so that some compensation is obtained. It has been found, however, that this solution has the following disadvantages: the residual errors in the corners are increased; the effect on the horizontal and vertical directions are different, so that satisfactory adjustment in both directions is difficult to realise; depending upon the axial position an undesirable influence may occur at the centre of the screen which in turn can be eliminated by the means, for example permanent magnets, provided for static convergence, requiring iterative and hence time-consuming trimming. Furthermore the coil is an expensive component.

The present invention is based on the recognition that the aforementioned convergence errors due to tolerance errors in the construction of the display tube and/or of the deflection coils can be eliminated by means of simple circuits without the need for additional components to be mounted on the neck of the display tube whilst avoiding the aforementioned disadvantages. For this purpose the apparatus according to the invention is characterized in that to correct for tolerance angular errors in the orientation of the plane in which the electron beams are generated relative to the first direction of deflection the split deflection coil generates a magnetic quadripolar field the polar axes of which substantially coincide with the directions of deflection and the field strength of which is a substantially quadratic function of the instantaneous strength of the deflection current flowing through either deflection coil or the sum of both quadratic functions.

It should be mentioned that it is known to use a split deflection coil to generate a quadripolar field the polar axes of which substantially coincide with the directions of deflection. This is described in U. S. Pat. No. 3,440,483 in which, however, the field strength of the quadripolar field is a function of the product of the values of the two deflection currents so that deflection errors due to anisotropic astigmatism can be corrected. In contradistinction thereto the present application described an apparatus having substantially no anistropic astigmatism whilst the quadripolar field generated according to the invention has a field strength which depends upon the value of either deflection current or upon the sum of the squares of the two deflection currents. For the sake of clarity it should be mentioned that in the apparatus according to the said U.S. Patent, in the absence of the correction quadripolar field described, the image of a beam on the screen is a tilted ellipse, whereas in the present application the corresponding image when not corrected is a vertical line.

The known apparatus has some isotropic astigmatism so that the vertical focal lines, i.e. the Meridional focal lines of the horizontal deflection plane and the sagittal focal lines of the vertical deflection plane, coincide with the display screen. Since the imaginary ribbon-shaped beam produced by the three beams together has substantially no dimension in the vertical direction, its image on the screen is a point. In these circumstances the term "isotropic astigmatism" as used herein in actual fact is to be understood to mean that the coefficients which determine the isotropic astigmatism differ from the desired values. Consequently the cross-sectional area on the screen of the imaginary thick beam of circular cross-section in the deflection plane (see FIG. 2 of the said paper in which, however, the three beams are generated in a vertical plane) does not degenerate into a straight line but takes the form of an ellipse the axes of which are parallel to the directions of deflection. Means for correcting such undesirable isotropic astigmatism is described in U.S. patent application Ser. No. 447,564 filed March 4, 1974. In this means a correcting quadripolar field which varies with the square of the strength of either deflection current is generated in the deflection region. However, the axes of said quadripolar field lie substantially along the diagonal between the axes of the deflection directions and the field is generated by separate windings and not by the deflection coil or coils. It should be noted that the apparatus according to the invention also may be subject to this defect which in this case may be corrected in the manner described in the said U.S. patent application. For the sake of simplicity this will be disregarded hereinafter, that is to say the deflection coil will be assumed to have the correct degree of isotropic astigmatism, causing the landing points of the beams on the screen to coincide in one point everywhere but for the abovementioned tolerance error.

Figure 2:
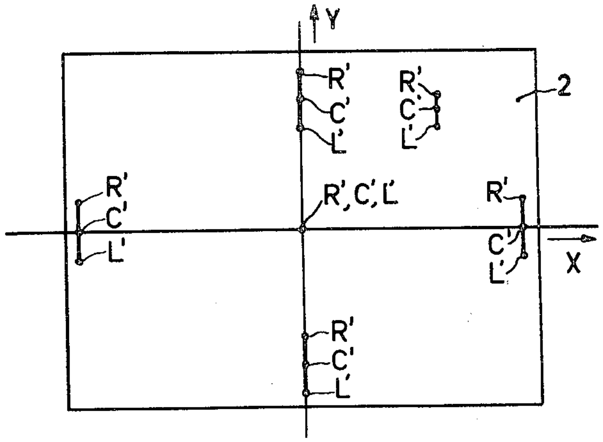
Figure 3:
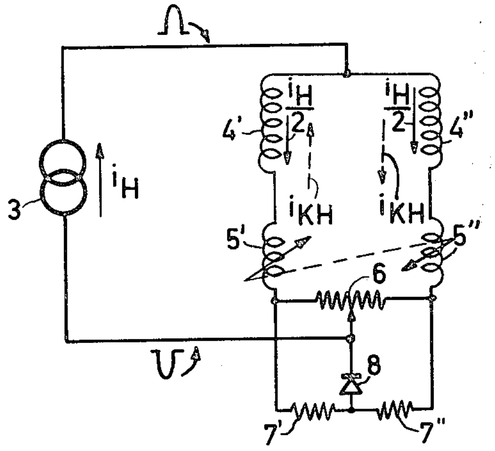
Figure 4:
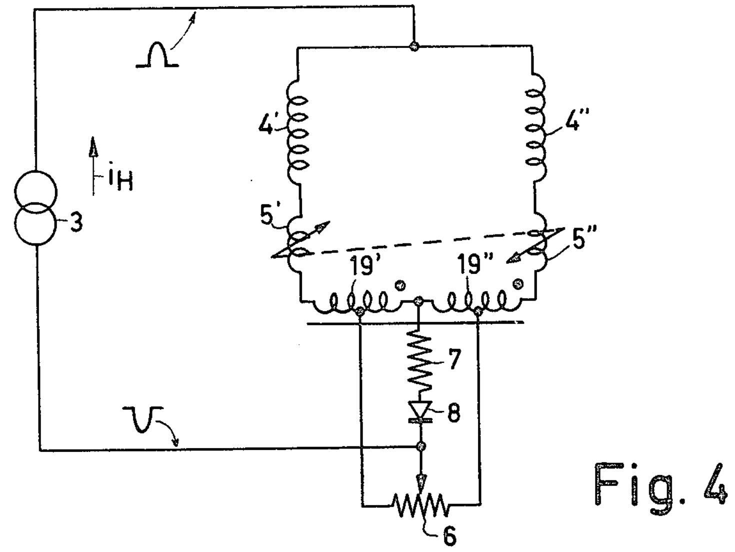
Figure 5:
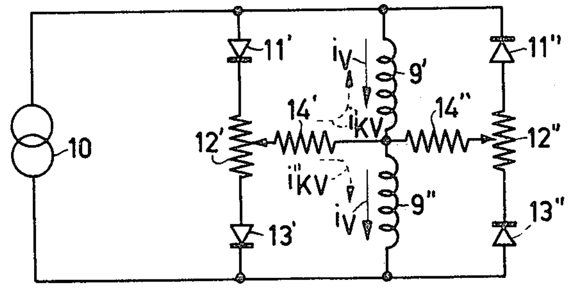
Figure 6:
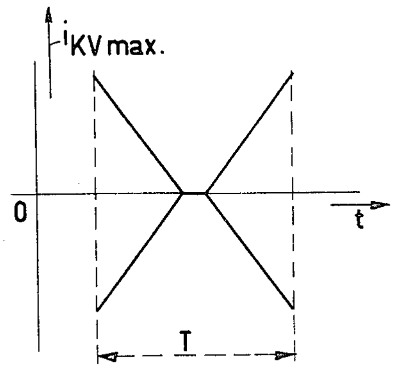

In order that the invention may be more readily understood, embodiments thereof will now be described by way of example with reference to the accompanying diagrammatic drawings, in which:

FIG. 1 is a sectional view of a colour television display tube subject to the defect to be corrected, FIG. 2 shows schematically the ensuring convergence error on the display screen of the tube, FIGS. 3, 4, 5 and 7 are circuit diagrams of embodiments of correction circuits, and FIG. 6 is a wave form obtained in the circuit of FIG. 5.

FIG. 1 is a simplified elevation of a cross-section of a colour television display tube 1 taken on the deflection plane at right angles to the axis of the tube in a direction opposite to the direction of propagation of the electron beams, the deflection coils being omitted for simplicity. Three electron beams L, C and R are generated in one plane, the beam C substantially coinciding with the axis of the tube 1 and the beams L and R being located to the left and to the right respectively of the beam C. If the construction of the devices, for example cathodes, which generate the beams and the field distribution within the tube 1 were exactly as desired, the points of intersection of the beams L, C and R with the deflection plane would be a straight line coinciding for example with the X axis, which coincides with the direction of horizontal deflection, the Y axis coinciding with the direction of vertical deflection. However, owing to tolerances the points of intersection lie on a straight line D which is at an angle $\alpha$ to the X axis which it intersects in C.

The paper mentioned in the second paragraph of this application shows that an imaginary thick beam may be considered the cross-section S of which with the plane of deflection is a circle. The line section LCR of FIG. 1 is a diameter of this circle. If the horizontal deflection field has a distribution in which the meridional image plane substantially coincides with the display screen of the tube 1 whilst the vertical deflection field has a distribution in which the sagittal image plane substantially coincides with the screen, and if moreover the deflection errors due to comma and both anisotropic and isotropic astigmatism are substantially equal to zero, all the points on and within the circle S are imaged on vertical line everwhere on the screen. It is supposed that the correct degree of isotropic astigmatism is actually obtained. Otherwise the image of the circle S would be an ellipse the axes of which are parallel to the X and Y axes, i.e. there would be a horizontal convergence error.

In these circumstances the beams L, C and R of FIG. 3 are imaged on the screen 2 of the tube 1 along vertical lines, some of which are shown (in exaggerated form) in FIG. 2, with the exception of the image at the midpoint of the screen, i.e. without deflection, where they coincide. In the ideal case in which the beams L and R of FIG. 1 would lie on the X axis, i.e. with $\alpha = 0$, in each triplet L', C', R' in FIG. 2 the points L' and R' would coincide with the point C'. Consequently the error angle $\alpha$ results in a vertical convergence error on the screen. In FIG. 1 the beam L lies above the X axis and the beam R beneath the X axis. Because the beams cross within the tube, the points L' and R' in FIG. 2 always lie beneath and above the point C' respectively.

According to the invention a magnetic correction quadripolar field is generated the polar axes of which substantially coincide with the X and Y axes and four lines of force of which are shown in FIG. 1. The quadripolar field does not influence the beam C which is located at the centre of the deflection plane. The beams L and R are subject to forces $F_L$ and $F_R$ respectively which are superposed on the forces exerted by the deflection fields. FIG. 1 shows that as a result the angle $\alpha$ is effectively reduced to substantially zero so that the convergence error of FIG. 2 is cancelled.

Such a quadripolar field is obtainable by causing an additional current, the difference current, to flow through a deflection coil divided in two coil halves in a manner such that the said current is added to the deflection current in one coil half and subtracted from it in the other coil half. FIG. 2 shows that the convergence errors on the left-hand and right-hand halves of the screen 2 have the same sign and that they have the same sign in the upper and lower halves. Hence it is desirable for the value of the difference current to vary substantially as the square of each deflection. Because initially the value and polarity of the angle $\alpha$ are unknown, the current must be adjustable both in amplitude and in polarity. At the middle of the line and field trace intervals the angle must be zero. For this purpose either one or both deflection coils may be used.

Because the images L', C', R' in FIG. 2 are vertical, i.e. are not tilted, the convergence error to be corrected is to be considered as an isotropic astigmatic deflection error. Hence the line-frequency component of the difference current must be a function of horizontal deflection only and its field-frequency component must be a function of vertical deflection only. Thus it is simpler, but not necessary, to cause the line-frequency component of the difference current to flow through the split deflection coil for horizontal deflection and its field-frequency component to flow through the split deflection coil for vertical deflection.

FIG. 3 shows a simple circuit for generating a line-frequency difference current which satisfies the said requirements. A line deflection current generator 3 at one terminal supplies a line-frequency sawtooth current $i_H$ to line deflection coil halves 4' and 4'', which in this embodiment are connected in parallel for the current $i_H$. Adjustable coils 5' and 5'' of low inductance are connected in series with the coil halves 4' and 4'' respectively. The coils 5' and 5'' may be adjusted jointly and oppositely so as to eliminate in knwon manner any asymmetry of the deflection fields generated by coil halves 4' and 4''. The ends of the coils 5' and 5'' not connected to the coil halves 4' and 4'' respectively are connected to one another via a potentiometer 6 the slider on which is connected to the other terminal of the generator 3. The resistance of, for example, 4.7 ohms of the potentiometer 6 is low compared with the impedance of the coil halves 4' and 4'' for the line repetition frequency. Thus a sawtooth voltage the polarity and amplitude of which depend upon the position of the slider is produced across the potentiometer 6. As a first approximation this voltage may be considered as being produced by a voltage source of low internal impedance. The coil halves 4' and 4'' pass a current which is proportioned to the integral of the voltage across the potentiometer 6 and consequently is the required parabolic correction difference current $i_{KH}$. In one coil half it flows in the same direction as the current $i_H/2$ and in the other coil half it flows in the opposite direction. For this purpose it is required that the position of the slider on the potentiometer 6 should differ from the electric midpoint thereof.

The potentiometer 6 is shunted by the series combination of two resistors 7' and 7'' the junction point of which is connected to the anode of a diode 8 the cathode of which is connected to the slider on the potentiometer 6. The diode 8 and the resistors 7' and 7'' ensure that the peak of the parabola will be at zero. In actual fact the diode 8 produces a direct current which compensates for the sagging of the parabola, provided that the resistances of the resistors 7' and 7'' are equal and have the correct value, for example 8.2 ohms. This direct current also is a difference current and since the diode 8 is connected to the slider on the potentiometer 6 the reversal of its polarity is automatically effected together with that of the parabolic component.

A disadvantage of the circuit of FIG. 3 may be that the obtainable amplitude of the current $i_{KH}$ is limited because the permissible value of the potentiometer 6 is limited, for a comparatively large value of this potentiometer will increase dissipation and give rise to a linearity error of the deflection current whilst the current $i_{KH}$ will no longer be parabolic but will also include higher-order components. The amplitude $i_{KH}$ may be increased without increasing the resistance of the potentiometer 6 by coupling the latter to the remainder of the circuit by means of a transformer. This may be achieved by an autotransformer, as is shown in FIG. 4. Two windings 19' and 19'' which are bifilarly wound on the same core and have the polarities shown are connected in series between the ends of the coils 5' and 5'' not connected to the coil halves 4' and 4'' respectively. The potentiometer 6 is connected between two tappings on the windings 19' and 19'' which are symmetrical with respect to the junction point thereof and the potentiometer slider is connected to said junction point via the series combination of the diode 8 and a resistor 7.

In the circuit shown in FIG. 4 the operation of the balancing coils 5' and 5'' is not disturbed, provided that the overall inductance value of the windings 19' and 19'' between the junction point of the winding 19' and the coil 5' and the junction point between the winding 19'' and the coil 5'' is small compared with the inductance value of the coil halves 4' and 4'' and the coils 5' and 5'' measured between the same points. In a practical embodiment of the circuit of FIG. 4 the latter value is 3.55 mH and the former value is 1.25 mH. This means that the effect of the balancing coils 5' and 5'' is reduced by only about one third. The tappings on the windings 19' and 19'' are provided at the midpoints thereof, the value of the resistor 6 is about 3.3 ohms and that of the resistor 7 about 0.5 ohm. It should be noted that the resistance of the windings 19' and 19'' should not be too small, for otherwise the direct component of the difference current would be short-circuited.

FIG. 5 shows a simple circuit for producing a field-frequency difference current in field-frequency deflection coil halves 9' and 9''. Since these coil halves are predominantly resistive for the field repetition frequency, the circuits shown in FIGS. 3 and 4 cannot be used. A field deflection current generator 10 supplies a fieldfrequency sawtooth current $i_V$ to coil halves 9' and 9'' which are connected in series in this embodiment. The series combination of a diode 11', a potentiometer 12' and a second diode 13' and the series combination of a third diode 11'', a potentiometer 12'' and a fourth diode 13'' are connected in parallel with the series combination of the said coil halves, the said four diodes having the polarities shown in FIG. 5. An isolating resistor 14' is connected between the slider on the potentiometer 12' and the junction point of the coil halves 9' and 9'', and an isolating resistor 14'' is connected between the slider of the potentiometer 12'' and the said junction point, the values of the isolating resistors being high relative to the impedance of the coil halves, for example about 100 ohms.

During one half of the field trace interval the current $i_V$ flows in the direction shown. Diodes 11' and 13' are conducting whereas diodes 11'' and 13'' are cutoff. Across the potentiometer 12' a sawtooth voltage is produced so that, if the position of the slider of the potentiometer 12' is different from the electric midpoint of the potentiometer, a sawtooth correction difference current $i'_{KV}$ flows through the coil half 9', for example in a direction opposite to that of the current $i_V$, whilst the coil half 9'' passes a sawtooth correction difference current $i''_{KV}$ in the same direction as the current $i_V$, the currents $i'_{KV}$ and $i''_{KV}$ being substantially equal. It should be noted that a difference current, in this embodiment $i''_{KV}$, flows through a diode, in this embodiment 13', from the cathode to the anode. However, because the elements 9', 9'', 11', 12', 13' and 14' form a Wheatstone bridge comprising resistors, the diodes cannot be cut off.

During the other half of the trace interval current $i_V$ flows in the other direction. The diodes 11'' and 13'' are conducting and the diodes 11' and 13' are cut off. Sawtooth difference currents are produced which are derived from the slider on potentiometer 12''. In FIG. 6 the variation of the extreme value $i_{KVmax}$ of the difference currents is shown as a function of time, T denoting the field trace interval. At the middle of the interval T these currents are zero, because the current $i_V$ and hence the voltage across the potentiometer 12' or 12'' respectively are zero. Owing to the voltage drop across the diode the difference currents are zero for a certain time before and after the middle of the interval T. The resulting curves may be regarded as approximate parabolas, for practice has shown that the residual convergence error is negligibly small. Because the difference currents produced are sawtooth currents, the potentiometers 12' and 12'' ensure also that the deflection fields generated by the coil halves 9' and 9'' are symmetrical. An advantage of the circuit of FIG. 5 is that the adjustments of the upper half and of the lower half are independent of one another, which conduces to clarity. In the embodiment described both potentiometers have a resistance of about 330 ohms.

It will be appreciated that the quadripolar field generated will only be capable of correcting for the vertical convergence error if the angle $\alpha$ is very small. The error introduced by the incorrect position of the line D is compensated for by the quadripolar field according to the invention, it is true, however, at large values of the angle $\alpha$ this field in turn introduces new errors, especially in the corners of the screen. Practice has shown that an angle of from 2° to 3° still can be corrected.

Hereinbefore no statement has been made about the construction of the deflection coils. If they are in the form of saddle coils, no special steps are required. If, however, they are wound toroidally, a step as described in U.S. patent application Ser. No. 390,701 filed August 23, 1973 must be used which consists in the introduction of the difference currents into the deflection coil halves via tappings. In this case the simple circuits of FIGS. 3, 4 and 5 are to be replaced by circuits in which the parabolic difference currents are generated in a different manner, for example by separate generators.

Figure 7:
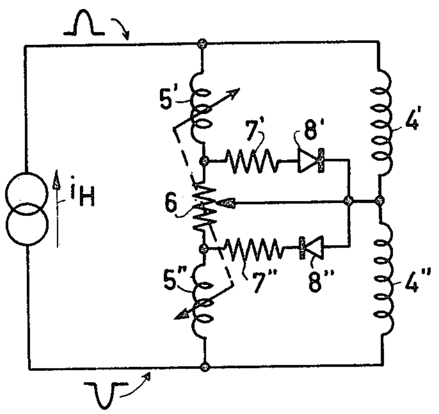

In the embodiments described the coil halves 4' and 4'' for horizontal deflection are connected in parallel for the line deflection current $i_H$, whereas the coil halves 9' and 9'' for vertical deflection are connected in series for the field deflection current $i_V$. Obviously this is not of importance for the invention and the coil halves may be connected in a different manner. FIG. 7 shows an embodiment in which the coil halves 4' and 4'' are connected in series for the current $i_H$. In this embodiment two diodes 8' and 8'' are required. It will further be appreciated that the invention may also be applied if the electron beams are generated in a plane of substantially vertical orientation, in which case the convergence error to be corrected is horizontal.

What is claimed is:

1. Colour television display apparatus incorporating a television display tube having a display screen and two deflection coils for the deflection in two directions of electron beams which are generated in the tube substantially in one plane, a first direction of deflection being substantially parallel to the said plane whilst the second direction of deflection is substantially at right angles to the first direction, the field generated by the deflection coil for deflection in the first direction having a distribution in which its meridional image plane substantially coincides with the screen whilst the field generated by the deflection coil for deflection in the second direction has a distribution in which its sagittal image plane substantially coincides with the screen, the deflection errors due to comma and anisotropic astigmatism being substantially equal to zero, whilst at least one deflection coil is divided into two substantially equal coil halves, characterized in that in order to correct for tolerance angular errors in the orientation of the plane in which the electron beams are generated relative to the first direction of deflection the split deflection coil generates a magnetic quadripolar field the polar axes of which substantially coincide with the directions of deflection and the field strength of which is a substantially quadratic function of the instantaneous strength of the deflection current flowing through at least one deflection coil, and means for clamping the peak of said quadratic field.

2. Apparatus as claimed in claim 1, characterized in that a substantially parabolic correction current which is adjustable in amplitude and in polarity flows in the same direction as the deflection current in one coil half and in the opposite direction in the other coil half and is zero at the middle of the trace interval of the deflection current.

3. Apparatus as claimed in claim 2, in which one direction of deflection is horizontal and the other is vertical, characterized in that a line-frequency correcting current flows through the coil halves of the deflection coil for horizontal deflection and a field-frequency correction current flows through the coil halves of the deflection coil for vertical deflection.

4. Apparatus as claimed in claim 2, characterized in that a sawtooth current supplied by the deflection current generator which produces the deflection current flows through a potentiometer the setting of the slider on which determines the adjustment of the polarity and of the amplitude of the correcting current.

5. Apparatus as claimed in claim 4, in which the deflection current is of field frequency, characterized in that the setting of the slider on the potentiometer also renders symmetrical the deflection fields generated by the coil halves.

6. A display apparatus as claimed in claim 1 wherein said split coil field strength is substantially the sum of quadratic functions of the current flowing through both coils.

7. A color television deflection system for a television display tube having a display screen, said system comprising two deflection coils for the deflection in two directions of electron beams which are generated in the tube substantially in one plane, said first direction of deflection being substantially parallel to the said plane, the second direction of deflection being substantially at right angles to the first direction, the field generated by the deflection coil for deflection in the first direction having a distribution in which its meridional image plane substantially coincides with the screen, the field generated by the deflection coil for deflection in the second direction having a distribution in which its sagittal image plane substantially coincides with the screen, the deflection errors due to comma and anisotropic astigmatism being substantially equal to zero, at least one deflection coil comprising two substantially equal coil halves, means for correcting for tolernace angular errors in the orientation of the plane in which the electron beams are generated relative to the first direction of deflection comprising means for providing that the split deflection coil generates a magnetic quadripolar field the polar axes of which substantially coincide with the directions of deflection and the field strength of which is a substantially quadratic function of the instantaneous strength of the deflection current flowing through at least one deflection coil, and means for clamping the peak of said quadratic field.

8. A deflection system as claimed in claim 7 wherein said split coil field strength is substantially the sum of quadratic functions of the current flowing through both coils.

* * * * *